United States Patent Office 2,866,800
Patented Dec. 30, 1958

2,866,800

SUBSTITUTED SILICON ACYLATES

Charles A. MacKenzie, New Orleans, La., and Milton Schoffman, Brooklyn, N. Y., assignors, by direct and mesne assignments, of one-half to Montclair Research Corporation, a corporation of New Jersey and one-half to Ellis-Foster Company, a corporation of New Jersey No Drawing. Application January 8, 1951
Serial No. 205,036

The terminal portion of the term of the patent to be granted subsequent to January 9, 1968 has been disclaimed

10 Claims. (Cl. 260—448.8)

This invention relates to substituted silicon acylates and their preparation, and more particularly to such silicon acylates containing substituent organic groups.

Among the objects of the present invention is the production of silicon acylates containing substituent organic groups attached to the silicon.

Further objects include methods for the preparation of the acylates.

Further objects include hydrolysis products of such acylates and compositions containing the acylates and their hydrolysis products.

Still further objects and advantages of the present invention will appear from the more detailed description set forth below, it being understood that this more detailed description is given by way of illustration and explanation only, and not by way of limitation since various changes therein may be made by those skilled in the art without departing from the scope and spirit of the present invention.

This application is a continuation-in-part of application Serial No. 683,984, filed July 15, 1949, now Patent No. 2,537,073 issued January 9, 1951, subject matter of the instant application having been divided out from the prior application and amplified herein.

In accordance with the present invention, substituted silicon acylates of carboxylic acids are prepared from an organo substituted silicon halide and a carboxylic acylating agent such as an organic carboxylic acid or a salt thereof.

The organo substituted silicon halide employed includes a variety of such compounds or mixture of such compounds, including organo substituted halogen silanes and organo substituted silicohaloforms such as silicochloroform. The halide may be any reactive halide including particularly the chlor and bromine derivatives. The substituent organo group in such compounds may be aliphatic or unsaturated aliphatic groups such as the alkyls including methyl, ethyl, propyl such as normal propyl, and isopropyl, butyl such as normal butyl, isobutyl, tertiary butyl, pentyl, hexyl such as normal hexyl, and unsaturated aliphatic groups including both olefinic and acetylenic linkages illustrated for example, by the allyl group; or the substituent organo group may be alicyclic such as cyclobutyl, cyclopentyl, cyclohexyl or may be aryl such as phenyl, tolyl, xylyl, benzyl, and the substituent organo groups present may contain substituents themselves such as halogen, etc., but no substituent group should be present in the organo group attached to the silicon which would interfere with the reaction involved.

The carboxylic acylating agent includes the carboxylic acids particularly of aliphatic and aromatic character and their anhydrides and salts, as for example, the alkali metal salts and also substituted acids and their salts where there is no substituent group in the acid which reacts with the silicon halide under the conditions employed. The acids may be monocarboxylic or polycarboxylic but monocarboxylic acids are preferred. Representing the aliphatic monocarboxylic acids there may be mentioned particularly the fatty acids such as formic, acetic, propionic, butyric, valeric and caproic acids, and illustrative of the aromatic acids are monobasic acids such as benzoic acid, toluic acids, and polybasic acids such as phthalic, isophthalic, terephthalic, and malonic series, etc.

The above mentioned reactants may be caused to react directly, either at ordinary or room temperatures or at elevated temperature as by heating the reaction mixtures or carrying out the reaction desirably under refluxing conditions. Direct reaction with the acids may readily take place, whereas with the salts elevated temperatures are employed thus temperatures of from 60 to 120° C. or other temperatures which produce refluxing may be utilized depending on the particular materials undergoing reaction. Hydrogen chloride or other analogous materials formed in the reaction may be removed from the reaction zone, as for example, by an inert gas such as nitrogen.

While the reactants may be made to react directly in the absence of any added materials, the reaction may desirably be carried out in the presence of organic liquid vehicles, particularly organic solvent liquids which are a solvent for at least one of the reactants employed. If desired, the organic liquid present may be chosen from the standpoint of solubility of the acylate produced. Thus solvents may be used in which the initial reagents are soluble but the final product is insoluble or a solvent may be used in which the initial reagents and final product are insoluble. Organic liquid solvents include pentane, ethyl bromide, isopropyl ether, benzene, toluene, and carbon tetrachloride.

With silicochloroform, it has been found that regardless of the amount of acid used, some tetra acylate forms. When organo substituted silicochloroform or similar haloform is utilized as a reactant, such as butyl silicochloroform, certainly the major product obtained is the diacylate. This butyl silicochloroform and the acetic acylating agents give the diacetate regardless of the ratio of the reactants. The alkyl or related group apparently has a stabilizing effect on the hydrogen attached to the silicon. With the salts of the acids such as the alkali metal salts of the fatty acids, the hydrogen in the haloform derivative is not replaced by the acid group as a general rule.

The proportions of the reactants employed may generally be based on the stoichiometric equivalents although generally from 3 to 8 moles of carboxylic acid or related compound to 1 mole of the silicon halide may be employed. The amount of solvent employed when present may vary substantially.

The substituted silicon halides thus employed in accordance with the present invention may be generally formulated as $R_a R'_b R''_c SiY_{(4-a-b-c)}$, in which R is an organo group such as alkyl or aryl as set forth above, R' is an organo group such as alkyl or aryl as set forth above, and may be the same as or different from R, R'' is hydrogen or an organo group such as alkyl or aryl as set forth above, and may be the same as or different from R and R', and Y is halogen, particularly chlorine, $a$ is from 1 to 3, and $b$ is from 0 to 1, $c$ is from 0 to 1, and $a+b+c$ is equal to, or less than 3. Thus for the organo substituted halides which contain no hydrogen attached to the silicon, the formula of the halide would be $R_a R'_b SiY_{(4-a-b)}$, where R, R', Y, $a$ and $b$ have the values set forth above. In the silicochloroform and related derivatives, the halide would have the formulation $R_a R'_b SiHY_{(3-a-b)}$, where R, R' and Y have the values set forth above, while $a$ is from 1 to 2, and $b$ is from 0 to 1.

Mixtures of different organo substituted organo silicon halides as formulated above may be utilized to produce a mixed organo silicon acylate of value in producing mixed siloxanes as by hydrolysis or oxidation, etc. Consequently mixed organo silicon acylates are a valuable article of commerce. Such mixed halides employed in producing mixed acylates, include (a) mixtures of two different organo silicon halides as formulated above each containing SiH groups, (b) mixtures of two different organo silicon halides as formulated above but neither containing SiH groups, and (c) more particularly mixtures containing at least one SiH containing organo silicon halide with at least one organo silicon halide containing no Si—H group, both as formulated above. Such mixed halides may be used in any desired ratios such as mole ratios of 1:10 to 10:1 of the different halides. By the presence of mixed derivatives, control of the ultimate properties of the acylates and of the siloxanes produced therefrom is possible as for example and particularly where both an SiH group derivative and a non-Si—H group derivative are present.

To differentiate the non-Si—H containing halides the formulation may be $R_dR'_eR''_fSiY_{(4-d-e-f)}$ where R, R', R'' and Y have the meanings set forth above and d, e, f, have the values for a, b, and c respectively in the formulations where R'' is present.

The substituted acylates produced in accordance with the present invention may be generally formulated as $R_aR'_bR''_cSiZ_{(4-a-b-c)}$, in which R is an organo group such as alkyl or aryl as set forth above, R' is an organo group such as alkyl or aryl as set forth above, and R'' is hydrogen or an organo group such as alkyl or aryl as set forth above, and Z is a carboxylic acyl group, a is from 1 to 3, b is from 0 to 1, c is from 0 to 1, while a+b+c is equal to, or less than 3. R, R' and R'' may be the same or different groups. Where no hydrogen is attached to the silicon, the acylates will have the formula $$R_aR'_bSiZ_{(4-a-b)},$$

where these terms have the values set forth immediately above. In the silicochloroform derived acylates and similar materials, the acylates will have the general formula $R_aR'_bSiHZ_{(3-a-b)}$, where R, R' and Z have the values set forth above, while a is from 1 to 2, and b is from 0 to 1.

The acylates produced from mixed organo substituted silicon halides will be mixed acylates whose nature will of course depend on the halides treated by acylation, the acylating agents, and to some extent at least on the conditions of acylation. Where the mixed halides are non-Si—H containing, the resulting mixed acylates will be non-Si—H containing. Where the mixed halides are Si—H containing and no non-Si—H containing halides are used, some of the hydrogen in the Si—H bonds may nonetheless be replaced by hydrocarbon groups present as pointed out above where silicochloroform for example is employed as a reactant so that mixed products may thus be produced containing at least one siloxane group having no Si—H group, and at least one siloxane group (Si—O—Si) having an Si—H group, the valences of silicon other than the said Si—H groups and silicon valences attached to oxygen in the siloxane chain being attached to monovalent hydrocarbon radicals. These last mentioned mixed acylates are of course formed also when the organo substituted silicon halides include mixtures of at least one Si—H containing halide with at least one non-Si—H containing halide. And in all instances where mixtures are used and mixed products are obtained, redistribution reactions may further redistribute the particular groups present among the silicon atoms. Where mixtures of different acylating agents are used, the ratios of the acylating agents may be molar ratios of from 1:10 to 10:1 for example. A variety of combinations are possible with mixed halides and mixed acylating agents.

Where the acylating agent is dicarboxylic or polycarboxylic as from aliphatic dicarboxylic acids such as the malonic series or aromatic dicarboxylic such as phthalic, mixed acylates can be prepared where the same silicon residue is attached to each acyl group or where each acyl group is attached to a different silicon residue. These types of derivatives may be formulated as $$R_aR'_bSiH.W.SiH.R'_bR_a$$

$$R_aR'_bSiH.W.SiR''_fR'_eR_d$$

$$R_dR'_eR''_fSiW.SiR''_fR'_eR_d$$

where R, R', R'', a, b, d, e, and f have the values set forth above and W is a diacyloxy residue. Similarly other corresponding poly acyl derivatives may be produced.

The acylates produced in accordance with the present invention have a variety of uses based on both expected and unexpected properties of such compounds. Thus some of the acylates such as ethyl silicon triacetate may be readily hydrolyzed by shaking with water to produce acetic acid and a colloidally dispersed ethyl silicone. The silicon containing material may be precipitated by removing part of the water, as for example, by distillation, or a rapid precipitation of the silicon materials may be obtained by the addition of ammonium hydroxide to the colloidal product. Similarly, diethyl diacetoxysilane may be hydrolyzed to give a colloidally dispersed diethyl silicone although diethyl silanediol may also be present to some extent. Thus generaly colloidal dispersions may be produced by mixing the acylates with water from which colloidal solutions or dispersions precipitation may be produced by removal of water or by the addition of ammonium hydroxide.

The acylates and hydrolyzed acylates produced in accordance with the present invention may be utilized either by themselves or in solution for the preparation of other types of silicon derivatives or for addition and utilization in coating compositions, lubricating oils, molding compositions, coatings for textiles, paper and related materials, in the production of laminated articles, etc.

The following examples will illustrate the invention, the parts being by weight unless otherwise indicated.

The first example describes the preparation of ethyl silicon triacetate by the action of acetic acid on ethyltrichlorosilane.

*Example 1.*—In a 300 ml. flask was placed a mixture of 20.5 g. of ethyl trichlorosilane, 22.2 g. of acetic acid and 40 ml. of pentane. A reflux condenser, with a calcium chloride drying tube attached to one end of it, was connected to the flask and the mixture was then heated until gentle refluxing took place. The heating was continued until the evolution of hydrogen chloride ceased (about 12 hours). The reaction product was subjected to distillation and there was obtained a 46% yield of ethyl silicon triacetate, B. P. 100–102° C. at 4 mm. Analytical data for ethyl silicon triacetate:

Equivalent wt.—Calc., 78; found, 77.
Percent silicon—Calc., 12.0; found, 12.3.
Mol. weight—Calc., 234; found, 223.

When a small sample of the ethyl silicon triacetate was shaken with water, hydrolysis occurred producing acetic acid and a colloidally dispersed ethyl siloxane. The silicon material could be precipitated by removing part of the water by distillation or a rapid precipitation could be had by the addition of ammonium hydroxide to the colloidal product.

The next example describes the preparation of diethyl silicon diacetate from sodium acetate and diethyldichlorosilane.

*Example 2.*—In a 300 ml., 3-neck flask, equipped with a stirrer and a reflux condenser, was placed a mixture of 19.7 g. of diethyldichlorosilane, 23 g. of sodium acetate and 50 ml. of benzene. The mixture was stirred and heated at about 100° C. for 2–3 hours. The reaction mixture was then filtered and the salt was washed with benzene. Distillation gave a 60% yield of diethyl silicon diacetate, B. P. 60° C. at 1-2 mm. Analytical data:

Equivalent wt.—Calc., 102; found, 103.
Molecular wt.—Calc., 204; found, 205.

When the product was shaken with water it was hydrolyzed to acetic acid and a dispersed diethylsiloxane. Some of the hydrolysis product may also have been in the form of a diethylsilanediol.

The next example describes the preparation of triethylsilicon monoacetate from triethylchlorosilane and sodium acetate.

*Example 3.*—In a 300 ml., 3-neck flask, equipped with a stirrer and a reflux condenser, was placed a mixture of 18.8 g. of triethylchlorosilane, 11.1 g. of sodium acetate and 50 ml. of benzene. The mixture was stirred and heated at about 100° C. for 2-3 hours. The reaction mixture was filtered and the salt was washed with benzene. Distillation gave a 45% yield of triethylsilicon monoacetate, B. P. 92° C. at 50 mm. Analytical data:

Equivalent wt.—Calc., 174; found, 180.
Molecular wt.—Calc., 174; found, 174.

The next sample describes the preparation of normal propyl silicon triacetate from normal propyltrichlorosilane and acetic acid.

*Example 4.*—In a 300 ml. flask was placed a mixture of 22.2 g. of n-propyl-trichlorosilane, 22.2 g. of acetic acid and 40 ml. of pentane. The mixture was heated, under reflux, at 60-80° C. for 8 hours. The reaction product was distilled and there was obtained a 50% yield of n-propyl silicon triacetate, B. P. 127-131° C. at 20 mm. Analytical data:

Equivalent wt.—Calc., 83; found, 81.
Molecular wt.—Calc., 248; found, 251.

A colloidal dispersion of the product was made by mixing it with water.

The next example describes the preparation of allyl silicon triacetate from allyltrichlorosilane and sodium acetate.

*Example 5.*—In a 300 ml., 3-neck flask, equipped with a stirrer and a reflux condenser, was placed a mixture of 21.8 g. of allyltrichlorosilane, 33 g. of sodium acetate and 50 ml. of benzene. The mixture was stirred and heated at about 100° C. for 2-3 hours. The reaction mixture was then filtered and the salt was washed with benzene. Distillation gave a 26% yield of allyl silicon triacetate, B. P., 90-95° C. at 1 to 2 mm. Analytical data:

Equivalent wt.—Calc., 82; found, 84.
Molecular wt.—Calc., 246; found, 241.

A colloidal dispersion of the material was obtained when it was hydrolyzed by shaking with water.

The next example describes the preparation of normal butyl silicon triacetate from normal butyltrichlorosilane and sodium acetate.

*Example 6.*—In a 3 liter, 3-neck flask, equipped with a stirrer and a reflux condenser, was placed a mixture of 156 g. of n-butyltrichlorosilane, 203 g. of sodium acetate and 400 ml. of benzene. The mixture was stirred and heated at about 100° C. for 3-4 hours. The reaction mixture was then filtered and the salt was washed with benzene. Distillation gave a 72% yield of butyl silicon triacetate, B. P. 106-108° C. at 1-2 mm. Analytical data:

Equivalent wt.—Calc., 87.5; found, 88.7.
Molecular wt.—Calc., 262; found, 262.
Percent silicon—Calc., 10.7; found, 9.5.

A colloidal dispersion of the material was obtained when it was hydrolyzed by shaking with water.

The next example describes the preparation of di-n-butyl silicon diacetate from di-n-butyldichlorosilane and acetic acid.

*Example 7.*—In a 300 ml. flask was placed a mixture of 26.6 g. of di-n-butyldichlorosilane, 15 g. of acetic acid and 40 ml. of pentane. The mixture was heated under reflux at 60-80° C. for about 8 hours. The reaction product was then distilled and there was obtained di-n-butyl silicon diacetate, B. P. 125-130° C. at 23 mm. Analytical data: Equivalent wt.—Calc., 130; found, 130.

The next example describes the preparation of ethyl silicon tripropionate from ethyl silicon trichloride and propionic acid.

*Example 8.*—In a 300 ml. flask, equipped with a reflux condenser, was placed a mixture of 20.5 g. of ethyl trichlorosilane, 27 g. of propionic acid and 40 ml. of pentane. The mixture was heated at 60-80° C. for about 8 hours. The reaction product was distilled. There was obtained a 76% yield of ethyl silicon tripropionate, B. P., 115-117° C. at 1-2 mm. Analytical data:

Equivalent wt.—Calc., 92; found, 92.
Molecular wt.—Calc., 276; found, 278.
Percent silicon—Calc., 10.2; found, 10.4.

A somewhat cloudy solution was obtained when the product was hydrolyzed by shaking with water. Addition of ammonium hydroxide precipitated the colloidally dispersed material.

The next example describes the preparation of diethyl silicon dipropionate from diethyldichlorosilane and sodium propionate.

*Example 9.*—In a 300 ml., 3-neck flask, equipped with a stirrer and reflux condenser, was placed a mixture of 19.7 g. of diethyldichlorosilane, 26.5 g. of sodium propionate and 50 ml. of benzene. The mixture was stirred and heated at about 100° C. for 2-3 hours. The reaction mixture was then filtered and the salt was washed with benzene. Distillation gave a 69% yield of diethyl silicon dipropionate, B. P. 81-82° C. at 2 mm. Analytical data: Molecular wt.—Calc., 232; found, 230.

The next example describes the preparation of phenyl silicon triacetate from phenyltrichlorosilane and sodium acetate.

*Example 10.*—In a 300 ml., 3-neck flask, equipped with a stirrer and reflux condenser, was placed a mixture of 26.8 g. of phenyltrichlorosilane, 33.1 g. of sodium acetate and 50 ml. benzene. The mixture was heated and stirred at about 100° C. for 2-3 hours. The reaction mixture was then filtered and the salt was washed with benzene. Distillation gave a 66% yield of phenyl silicon triacetate, B. P. 144-146° C. at 1-2 mm.; M. P. 38-39° C. Analytical data:

Equivalent wt.—Calc., 94; found, 93.
Molecular wt.—Calc., 282; found, 285.

A clear solution was obtained when the product was hydrolyzed by shaking with water. The addition of ammonium hydroxide to the solution precipitated the product as a fine white powder.

The next example describes the product obtained by treating normal hexyltrichlorosilane with sodium acetate.

*Example 11.*—In a 100 ml. flask, equipped with a reflux condenser, was placed a mixture of 4.3 g. of n-hexyltrichlorosilane, 5.8 g. of sodium acetate and 25 g. of benzene. The mixture was heated at about 100° C. for 2-3 hours. The reaction mixture was filtered and the salt was washed with benzene. Distillation gave a crude sample of n-hexyl silicon triacetate, B. P. 125-135° C. at 1-2 mm.

The next example describes the preparation of dimethyl silicon diacetate from dimethyldichlorosilane and sodium acetate.

*Example 12.*—In a 300 ml., 3-neck flask equipped with a stirrer and reflux condenser, was placed a mixture of 16.1 g. dimethyldichlorosilane, 23 g. sodium acetate and 50 ml. benzene. The mixture was stirred and heated at about 100° C. for 2-3 hours. The reaction mixture was filtered and the salt was washed with benzene. Distillation gave a 60% yield of dimethyl silicon diacetate, B. P. 88–90° C. at 50 mm. Analytical data:

Equivalent wt.—Calc., 88; found, 91.
Molecular wt.—Calc., 176; found, 187.

The next example describes the preparation of a mixture of butyl silicon acetates.

*Example 13.*—A mixture of silicon chlorides was prepared by adding a solution of one-quarter mole of butyl bromide and one-quarter mole of silicon tetrachloride to one-quarter gram atomic weight of magnesium turnings in 150 ml. of ether. After the reaction had finished there was added to the mixture 100 ml. of benzene and 67 grams of sodium acetate. The ether was removed by distillation and the mixture was heated to about 100° C. for 3 hours. The liquid layer was then decanted and the salt washed with three 50 ml. portions of benzene. On distillation there was obtained, after the removal of the benzene, 40 grams of a mixture of silicon acetates. Fractionation of this material produced 20 grams of butyl silicon triacetate.

The next example describes the preparation of butyl-diacetoxysilane from butyldichlorosilane and sodium acetate.

*Example 14.*—In a 300 ml., 3-neck flask, equipped with a stirrer and a reflux condenser, was placed a mixture of 20 grams of butyldichlorosilane, 30 grams of sodium acetate and 50 ml. of benzene. The mixture was stirred and heated at about 100° C. for 2-3 hours. The reaction mixture was then filtered and the salt was washed with benzene. Distillation gave a liquid product boiling at 125–127° C. at 37 mm. Analytical data: Equivalent weight—Calc. for butyldiacetoxysilane, 102; found, 103.

The next example describes the preparation of butyldipropionoxysilane from butyldichlorosilane and propionic acid.

*Example 15.*—In a 300 ml. flask was placed a mixture of 20 grams of butyldichlorosilane, 19 ml. of propionic acid and 40 ml. of pentane. The mixture was refluxed for 6 hours. When the reaction mixture was fractionally distilled there was obtained a liquid boiling at 90° C. at 2 mm. Analytical data: Equivalent weight—Calc. for butyldipropionoxysilane, 116; found, 114.

The next example describes the preparation of dibutyl silicon dibenzoate.

*Example 16.*—In a 300 ml., 3-neck flask, equipped with a stirrer and a reflux condenser was placed a mixture of 26.6 grams of dibutyldichlorosilane, 20 grams of sodium benzoate and 100 ml. of benzene. The mixture was heated, with stirring, at about 100° C. for 3 hours. The reaction mixture was filtered and the salt was washed with benzene. The benzene was then removed under reduced pressure. The remaining liquid was readily hydrolized to a dibutyl silicone and benzoic acid. The product before hydrolysis gave the following results on analysis:

Molecular weight—Calc. for dibutyl silicon dibenzoate, 384; found, 365.
Neutral equiv.—Calc., 192; found, 212.

The next example describes the preparation of butyl silicon triformate.

*Example 17.*—In a 300 ml., 3-neck flask, equipped with a stirrer and a reflux condenser, was placed a mixture of 24 grams of butyltrichlorosilane, 40 grams of sodium formate and 100 ml. of toluene. The mixture was heated, with stirring, at 110–120° C. for 4 hours. The reaction mixture was filtered and the salt was washed with toluene. The toluene was removed by distillation under reduced pressure. The remaining liquid had a boiling range of 150–160° C. at 50 mm. Analytical data:

Molecular weight—Calc. for butyl silicon triformate, 220; found, 231.
Neutral equivalent—Calc., 73; found, 73.

*Example 18.*—In a 300 ml., 3-neck flask, equipped with a stirrer and a reflux condenser was placed a mixture of 9.4 g. of triethylchlorosilane, 13.4 g. of phenyl trichlorosilane, 22.2 g. of sodium acetate and 50 ml. of benzene. The mixture was stirred and heated at about 100° C. for 2-3 hours. The reaction mixture was filtered and the salt was washed with benzene. Distillation gave a mixed acylate. The mixed acylate may be hydrolyzed by shaking with water. The addition of ammonium hydroxide to the solution precipitated the product as a fine white powder.

*Example 19.*—In a 300 ml., 3-neck flask, equipped with a stirrer and a reflux condenser, was placed a mixture of 6.6 g. of diethyldichlorosilane, 14.6 g. of allyltrichlorosilane, 29.6 g. of sodium acetate and 50 ml. of benzene. The mixture was stirred and heated at about 100° C. for 2-3 hours. The reaction mixture was filtered and the salt washed with benzene. Distillation gave a mixed acylate including principally diethylsilicon diacetate and allyl silicon triacetate.

Mixed acylates may also be prepared by using mixtures of acylating agents. For example in Example 19, part of the sodium acetate may be replaced by sodium formate thus giving a complex acylate having present principally ethyl and allyl silicon acetates and formates.

If in Example 19, the sodium acetate is replaced by an equivalent amount of sodium phthalate, corresponding ethyl and allyl silicon phthalates are produced.

*Example 20.*—In a 300 ml., 3-neck flask, equipped with a stirrer and a reflux condenser, was placed a mixture of 9.8 g. of diethyldichlorosilane, 10 g. of butyldichlorosilane, 27 g. of sodium acetate and 50 ml. of benzene. The mixture was stirred and heated at about 100° C. for 2-3 hours. The reaction mixture was filtered, and the salt washed with benzene. Distillation gave a mixed acylate including principally diethyl silicon diacetate and butyl diacetoxysilane. This mixed acylate may be hydrolyzed by water to give a siloxane product containing SiH groups and butyl and ethyl groups attached to silicon.

Having thus set forth our invention, we claim:

1. The method of making organo substituted silicon acylates which comprises reacting a mixture in substantial amounts of each of an organo substituted silicon halide having the formula $R_aR'_bSiHY_{(3-a-b)}$ where R and R' are monovalent hydrocarbon radicals and Y is halogen, $a$ is from 1 to 2, $b$ is from 0 to 1, and $a+b$ is not greater than 2, and an organo substituted silicon halide having the formula $R_dR'_eR''_fSiY_{(4-d-e-f)}$ where R and R' are monovalent hydrocarbon radicals, R'' is selected from the group consisting of monovalent hydrocarbon radicals and hydrogen, Y is halogen, $d$ is from 1 to 3, $e$ is from 0 to 1, $f$ is from 0 to 1, and $d+e+f$ is not greater than 3, the second organo substituted silicon halide being different from the first mentioned organo substituted silicon halide, with a carboxylic acylating agent selected from the group consisting of aliphatic and aromatic carboxylic acids, their anhydrides and salts.

2. The method as set forth in claim 1 in which the reactants are heated together in the presence of an organic liquid solvent for at least one of the reactants.

3. The method as set forth in claim 1 wherein hydrocarbon groups attached to silicon are non-hydrolyzable which includes the further step of hydrolyzing the organo substituted silicon acylates formed by said reaction to form hydrocarbon substituted siloxanes.

4. The method of making organo substituted silicon acylates which comprises reacting a mixture in substantial amounts of each of an organo substituted silicon halide having the formula $R_aR'_bSiHY_{(3-a-b)}$ where R and R' are monovalent hydrocarbon radicals and Y is halogen, $a$ is from 1 to 2, $b$ is from 0 to 1, and $a+b$ is not greater than 2, and an organo substituted silicon halide having the formula $R_dR'_eR''_fSiY_{(4-d-e-f)}$ where R, R' and R'' are monovalent hydrocarbon radicals, Y is halogen, $d$ is from 1 to 3, $e$ is from 0 to 1, $f$ is from 0 to 1 and $d+e+f$ is not greater than 3, the second organo substituted silicon halide being different from the first mentioned organo substituted silicon halide, with a carboxylic acid acylating agent.

5. The method as set forth in claim 4 in which the reactants are heated together in the presence of an organic liquid solvent for at least one of the reactants.

6. The method as set forth in claim 4 wherein hydrocarbon groups attached to silicon are non-hydrolyzable, which includes the further step of hydrolyzing the organo substituted silicon acylates formed by said reaction to form hydrocarbon substituted siloxanes.

7. The method of making organo substituted silicon acylates which comprises reacting a mixture in substantial amounts of each of an organo substituted silicon halide having one hydrogen attached directly to silicon the remaining valences of silicon being satisfied by alkyl radicals and halogen, there being at least one alkyl and at least one halogen attached to silicon, and an organo substituted silicon halide having no hydrogen attached directly to silicon, the remaining valences of silicon being satisfied by alkyl radicals and halogen, there being at least one alkyl and at least one halogen attached to silicon, with a carboxylic acid acylating agent.

8. The method as set forth in claim 7 wherein hydrocarbon groups attached to silicon are non-hydrolyzable, which includes the further step of hydrolyzing the organo substituted silicon acylates formed by said reaction to form hydrocarbon substituted siloxanes.

9. As an article of commerce of particular value for production of siloxanes, a mixture in substantial amounts of each of an organo substituted silicon acylate having the formula $R_aR'_bSiHZ_{(3-a-b)}$ where R and R' are monovalent hydrocarbon groups, Z is a carboxylic acyl group, $a$ is from 1 to 2, $b$ is from 0 to 1, and $a+b$ is not greater than 2, and an organo substituted silicon acylate having the formula $R_dR'_eR''_fSiZ_{(4-d-e-f)}$ where R is a monovalent hydrocarbon radical of from 1 to 6 carbon atoms, R' is a monovalent hydrocarbon radical, R'' is selected from the group consisting of monovalent hydrocarbon radicals and hydrogen, and Z is a carboxylic acyl group, $d$ is from 1 to 3, $e$ is from 0 to 1, $f$ is from 0 to 1, and $d+e+f$ is not greater than 3, the second acylate differing from the first.

10. The product as set forth in claim 9 in solution in a liquid organic solvent therefor.

References Cited in the file of this patent

UNITED STATES PATENTS

| | | |
|---|---|---|
| 2,382,082 | McGregor et al. | Aug. 14, 1945 |
| 2,405,988 | Barry | Aug. 20, 1946 |
| 2,448,556 | Sprung | Sept. 7, 1948 |
| 2,491,843 | Wilcox | Dec. 20, 1949 |
| 2,537,073 | MacKenzie | Jan. 9, 1951 |
| 2,634,285 | Rust | Apr. 7, 1953 |

OTHER REFERENCES

Friedel et al.: "Annales de Chemie," 4th series, vol. 19 (1870), pp. 351–54.

Kipping: Proc. Chem. Soc., vol. 15 (1899), p. 174.

Volnov: "Journal Gen. Chemistry" (USSR), vol. 16, pp. 1600–1604 (1940).